US008261630B2

(12) United States Patent
Bak et al.

(10) Patent No.: US 8,261,630 B2
(45) Date of Patent: Sep. 11, 2012

(54) APPARATUS FOR ELECTRONICALLY CONTROLLABLE TRANSMISSION

(75) Inventors: Jeong-Ho Bak, Gyeongsan-si (KR); Byung-Ki Kim, Gyeongsan-si (KR)

(73) Assignee: SL Corporation (KR)

( * ) Notice: Subject to any disclaimer, the term of this patent is extended or adjusted under 35 U.S.C. 154(b) by 117 days.

(21) Appl. No.: 12/783,685

(22) Filed: May 20, 2010

(65) Prior Publication Data

US 2010/0294067 A1 Nov. 25, 2010

(30) Foreign Application Priority Data

May 20, 2009 (KR) .................. 10-2009-0044106

(51) Int. Cl.
- B60K 17/04 (2006.01)
- B60K 17/12 (2006.01)
- B60K 20/00 (2006.01)
- G05G 5/08 (2006.01)

(52) U.S. Cl. .................. 74/473.12; 74/473.26
(58) Field of Classification Search .......... 74/473.1, 74/473.12, 473.21, 473.25, 473.26, 473.3, 74/473.32, 473.33; 324/160, 178–179
See application file for complete search history.

(56) References Cited

U.S. PATENT DOCUMENTS

| 6,404,187 | B1 * | 6/2002 | Ruckert | 324/207.2 |
| 2002/0157492 | A1 * | 10/2002 | Hayashi et al. | 74/336 R |
| 2007/0035294 | A1 * | 2/2007 | Peczalski et al. | 324/252 |
| 2008/0041182 | A1 * | 2/2008 | Giefer et al. | 74/473.33 |
| 2008/0078604 | A1 * | 4/2008 | Ersoy et al. | 180/336 |
| 2008/0078904 | A1 | 4/2008 | Trimble | |

FOREIGN PATENT DOCUMENTS

JP    2009006910 A    1/2009

* cited by examiner

*Primary Examiner* — Justin Krause
*Assistant Examiner* — Gregory Prather
(74) *Attorney, Agent, or Firm* — Lando & Anastasi, LLP

(57) ABSTRACT

Provided is an apparatus for electronically controllable transmission, and more particularly, an apparatus for electronically controllable transmission, the apparatus capable of shifting gears by moving a shift lever and sensing the magnetic flux density of a magnet, which moves in accordance with the rotation of the shift lever, by using a three-dimensional (3D) hall sensor. The apparatus includes: a shift lever including one end which is connected to a magnet and shifting gears by moving the shift lever; a shift lever body which is connected to the shift lever and is allowing the shift lever to move around shift axis or select axis; and a sensor unit including a 3D sensor which is mounted fixedly in the place intersecting the shift axis and select axis within the shift lever body and can sense the movement of the magnet around an X-axis, a Y-axis and a Z-axis as the magnet moves, wherein the 3D sensor is mounted at a tilted angle for providing at least two of three output signals with linearity.

15 Claims, 15 Drawing Sheets

APPARATUS FOR ELECTRONICALLY CONTROLLABLE TRANSMISSION

This application claims priority from Korean Patent Application No. 10-2009-0044106 filed on May 20, 2009 in the Korean Intellectual Property Office, the disclosure of which is incorporated herein by reference in its entirety.

BACKGROUND OF THE INVENTION

1. Field of the Invention

The present invention relates to an apparatus for electronically controllable transmission, and more particularly, to an apparatus for electronically controllable transmission, the apparatus capable of shifting gears by sensing the magnetic flux density of a magnet as the magnet connected to a shift lever moves.

2. Description of the Related Art

Vehicle transmissions change gear ratios to maintain the torque of an engine constant according to the speed of a vehicle. To change the gear ratios of a transmission, a shift lever of the transmission may be operated. Generally, there are two types of transmissions. One is a manual mode transmission that allows a user to manually shift gears, and the other is an automatic mode transmission that automatically shifts gears according to the speed of a vehicle when a user selects a drive (D) mode.

Another type is a sports mode transmission that can operate both in a manual transmission mode and an automatic transmission mode. The sports mode transmission basically operates in the automatic transmission mode but switches to the manual transmission mode when a user selects a higher or lower gear. The sports mode transmission may also be configured by installing an automatic mode transmission next to a manual mode transmission.

Examples of gears that can be selected by a user in an electronic transmission include park (P), reverse (R), neutral (N), drive (D), and "+" and "−" in which an engine brake is operated.

An electronic transmission includes a two-dimensional (2D) sensor, such as a linear hall sensor or a switch hall sensor, to sense the position of a shift lever. Here, the hall sensor is a sensor that uses a magnet and converts a magnetic force into an electrical signal. Thus, a gear selected by a user is sensed based on the electrical signal output from the hall sensor. Specifically, the position of the shift lever can be identified based on an electrical signal (mostly, a voltage) output from the hall sensor.

To sense the position of a shift lever moving in a forward or backward direction or in a lateral direction, that is, to sense shift positions (P, R, N and D) and select positions (+ and −) of the shift lever, a magnet connected to the shift lever is placed above a 2D hall sensor. The 2D hall sensor senses the magnetic flux density of the magnet as the position of the magnet changes in accordance with the movement of the shift lever.

However, the conventional 2D hall sensor requires a plurality of sensors for each gear and must maintain a constant gap between itself and the magnet. That is, the conventional 2D hall sensor requires an additional structure, such as a bracket, to move the magnet parallel to the 2D hall sensor, so that the gap between the 2D hall sensor and the magnet is maintained unchanged while the shift lever moves in the forward or backward direction or the lateral direction, thereby maintaining the intensity of the magnetic flux density of the magnet constant.

FIG. 1 is a perspective view of a conventional apparatus 20 for electronically controllable transmission.

Referring to FIG. 1, in the conventional apparatus 20, an inner case 10 is inserted into a first holder unit 12, and the first holder unit 12 is inserted into a second holder unit 13 in order to maintain a constant gap between a magnet 11 disposed in the inner case 10 and a plurality of sensors 17 disposed in the second holder unit 13.

The magnet 11 in the first holder unit 12 is horizontally moved by a guide portion 14 which is formed in a lower portion of the inner case 10 and a guide groove 15 which is formed in a lower portion of the first holder unit 12. Also, the magnet 11 is vertically moved by the placement of a side surface of the first holder unit 12 on a plurality of rails 16 which are formed in a side surface of the second holder unit 13.

The conventional apparatus 20 for electronically controllable transmission can detect the position of the magnet 11 only in a particular direction and is an essential structure for sensing a constant magnetic field of the magnet 11.

However, the installation of a plurality of holder units 12 and 13 is required to maintain a constant gap between the magnet 11 and the sensors 17. Accordingly, the increased number of such structures increases the size of a sensor unit, reduces layout utilization, and raises related costs.

SUMMARY OF THE INVENTION

Aspects of the present invention provide an apparatus for electronically controllable transmission, the apparatus capable of easily sensing the position of a shift lever using one sensor and detecting a gear desired by a driver even without maintaining a constant gap between a magnet and the sensor.

Aspects of the present invention also provide an apparatus for electronically controllable transmission, the apparatus employing a three-dimensional (3D) hall sensor, which can sense the movement of a magnet on all of X-, Y- and Z-axes, in order to sense the movement of a shift lever in a plurality of transmission channels by using one magnet.

Aspects of the present invention also provide an apparatus for electronically controllable transmission, the apparatus capable of sensing the position of a shift lever in a stable manner by having a 3D sensor turned at a predetermined angle so that at least some of X-, Y- and Z-axis signals can be generated linearly when a magnet moves in one direction.

Aspects of the present invention also provide an apparatus for electronically controllable transmission, capable of sensing a constant magnetic flux density by having a magnet, which is connected to a shift lever, and a sensor configured to maintain a constant gap between them.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, there is provided an apparatus for electronically controllable transmission. The apparatus includes: a shift lever including one end which is connected to a magnet and shifting gears by moving the shift lever; a shift lever body which is connected to the shift lever and is allowing the shift lever to move around shift axis or select axis; and a sensor unit including a sensor which is mounted fixedly in the place intersecting the shift axis and select axis within the shift lever body and is sensing the magnet flux of the magnet depending on movement of the shift lever at the predetermined gap with the sensor, wherein the sensor is a 3D hall sensor which faces the magnet and can sense the movement of the magnet around an X-axis, a Y-axis and a Z-axis as the magnet moves.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Figure 1:
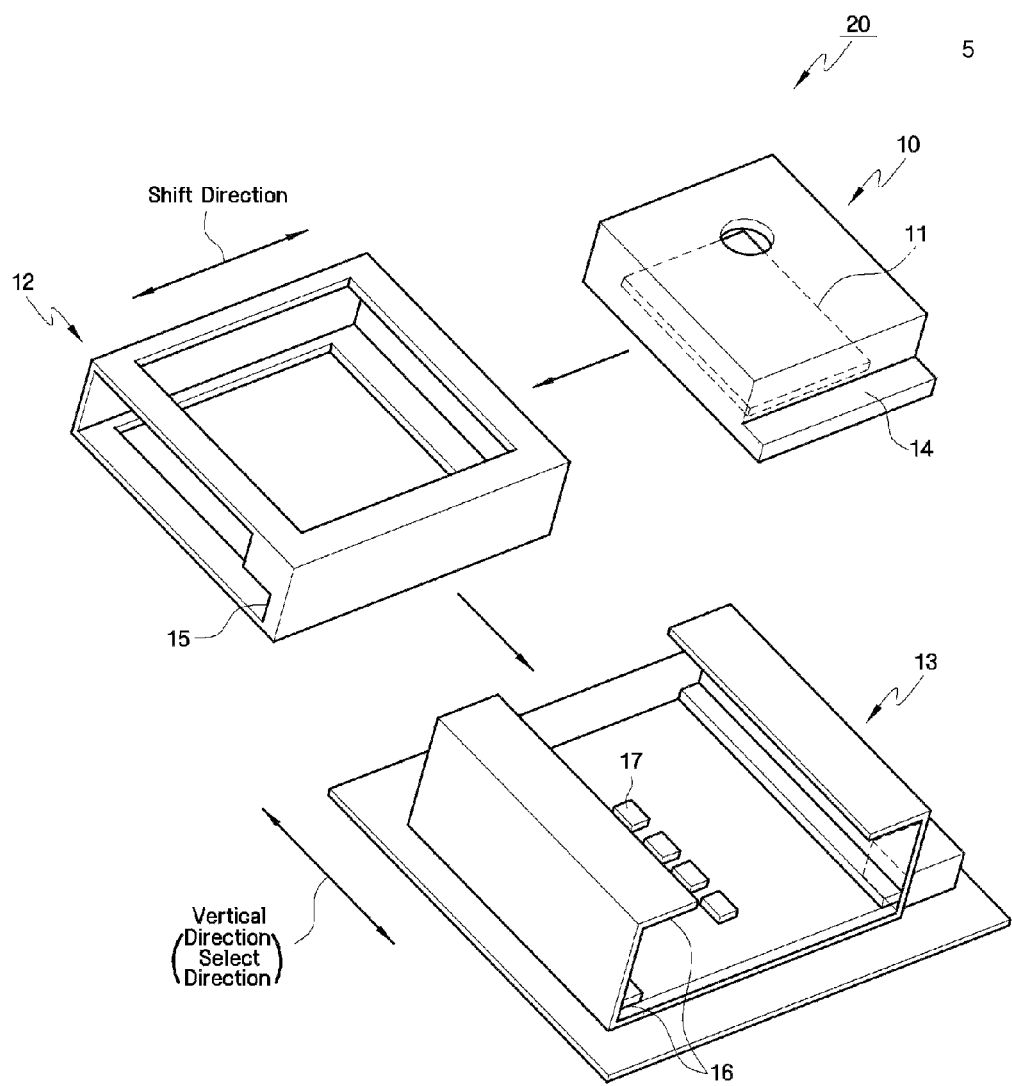
FIG. 1 is a perspective view of a conventional apparatus for electronically controllable transmission.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

In some embodiments, well-known processes, structures, and technologies will not be specifically described in order to avoid ambiguous interpretation of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated components, steps, operations, and/or elements, but do not preclude the presence or addition of one or more other components, steps, operations, elements, and/or groups thereof.

Embodiments of the invention are described herein with reference to cross-section and/or schematic illustrations that are illustrations of idealized embodiments of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. In addition, each component shown in figures of the present invention may have been enlarged or reduced for ease of description. Like numbers refer to like elements throughout.

Hereinafter, an apparatus for electronically controllable transmission according to exemplary embodiments of the present invention will be described with reference to the attached drawings.

Figure 2A:
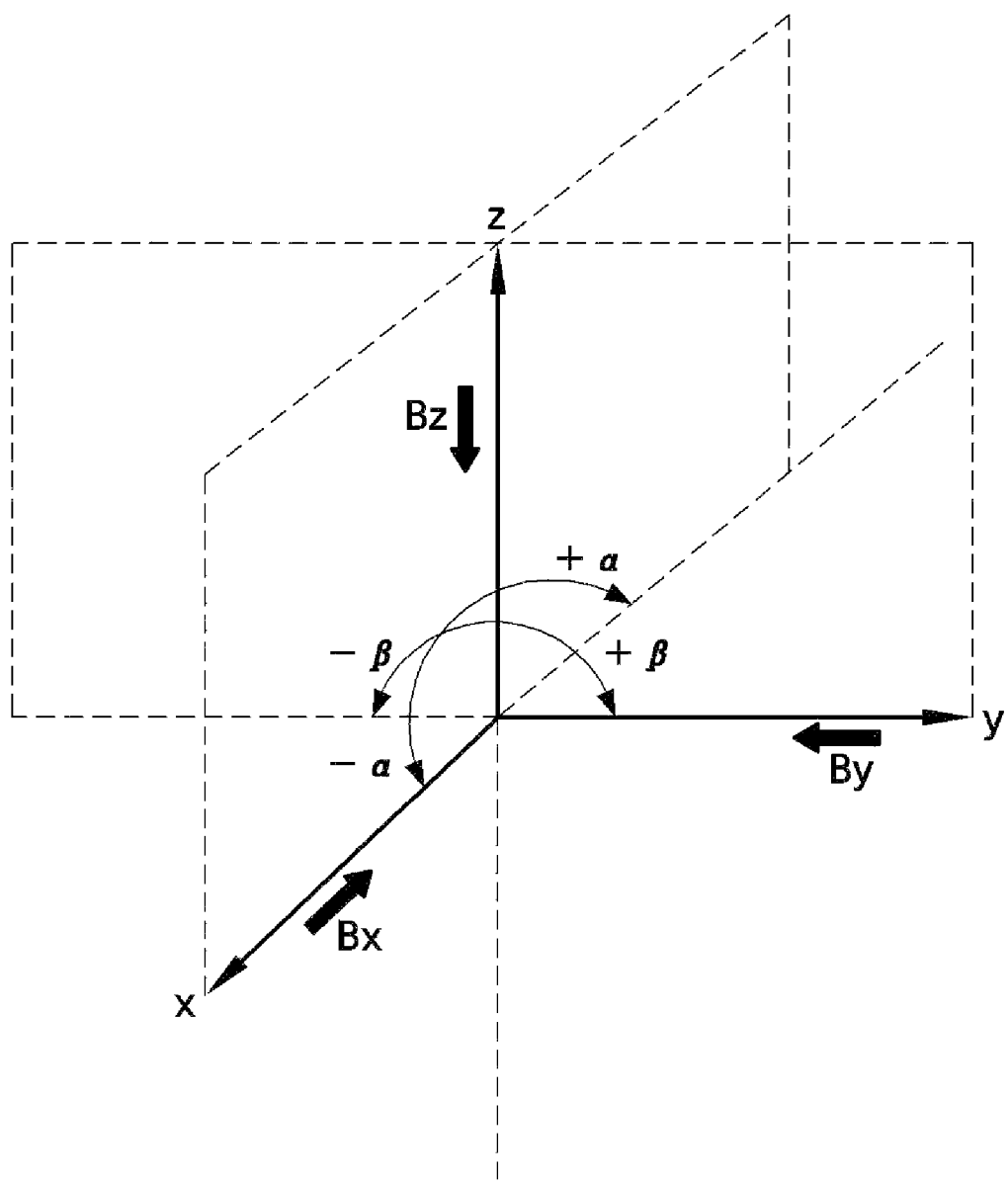
FIGS. 2A and 2B are schematic diagrams of a three-dimensional (3D) hall sensor according to the present invention.
Figure 2B:
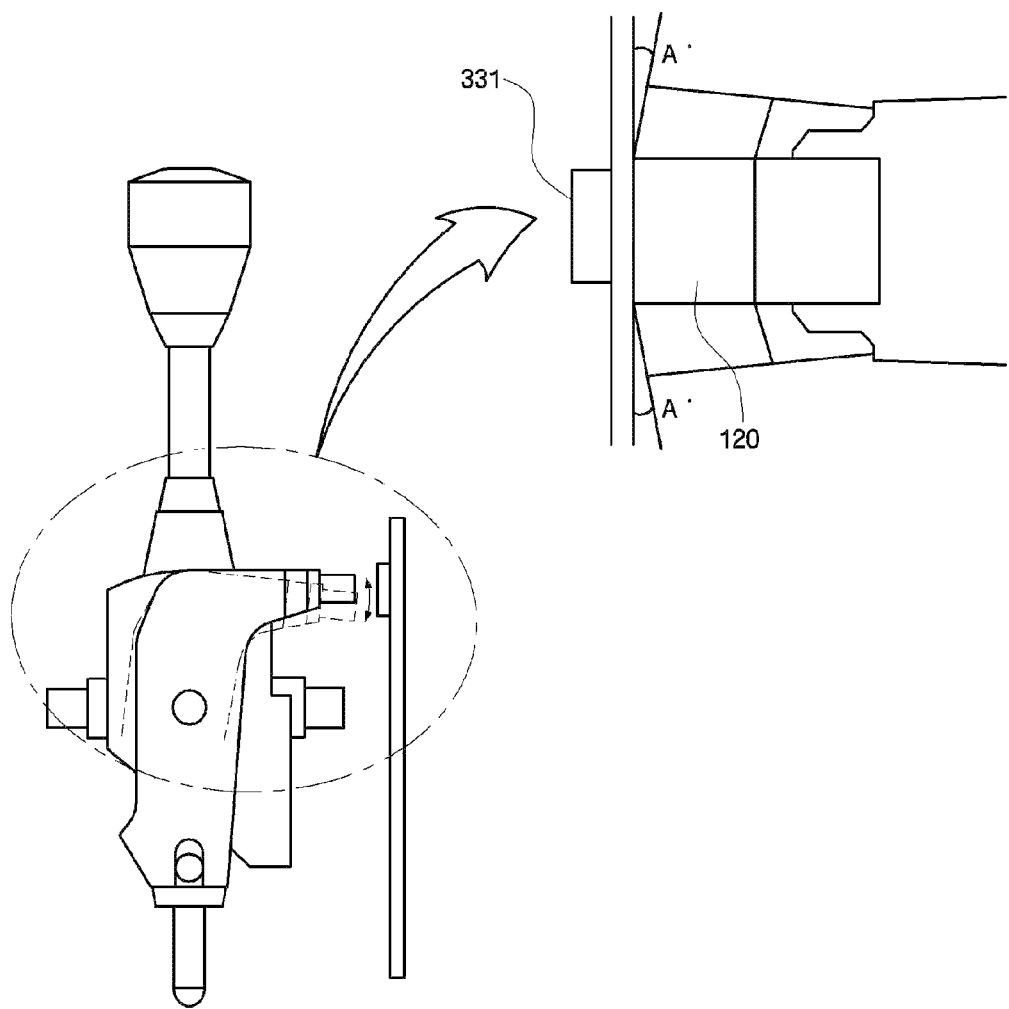

FIGS. 2A and 2B are schematic diagrams of a three-dimensional (3D) hall sensor applied to the present invention. When the 3D hall sensor is positioned in a plane and when a magnet moves in a space above the 3D hall sensor, the 3D hall sensor applied to the present invention can sense the positions of the magnet on X- and Y-axes as well as the position of the magnet on a Z-axis which corresponds to the spatial distance of the magnet from the 3D hall sensor. That is, wherever the magnet is located in the space, the position of the magnet can be determined to be a location at which an alpha ($\alpha$) angle of the X-axis and a beta ($\beta$) angle of the Y-axis meet.

In addition, the position of the magnet on the Z-axis can be determined by detecting the height of the location at which the alpha ($\alpha$) angle of the X-axis and the beta ($\beta$) angle of the Y-axis meet. Therefore, the position of the magnet can be detected even without maintaining a constant gap between the 3D hall sensor and the magnet.

Referring to FIG. 2B, an initial position of a magnet 120 is indicated by a solid line, and the upward or downward movement of the magnet 31 according to the upward or downward movement of a shift lever is indicated by a broken line. When the magnet 31 rotates upward or downward in accordance with the rotation of the shift lever, it forms a certain angle A° with respect to a 3D sensor 331 toward the end of the radius of the rotation. Since a conventional hall sensor cannot sense the angle A°, that is, the distance between itself and the magnet 31 on the Z-axis, the position of the magnet 31 detected by the conventional hall sensor is often inaccurate. However, the 3D sensor 32 can sense the angle A° by which the magnet 31 is separated from the 3D hall sensor 32, that is, the distance between itself and the magnet 31 on the Z-axis.

Thus, the 3D sensor 32 can sense the position of the magnet 31 wherever the magnet 31 moves.

Figure 3:
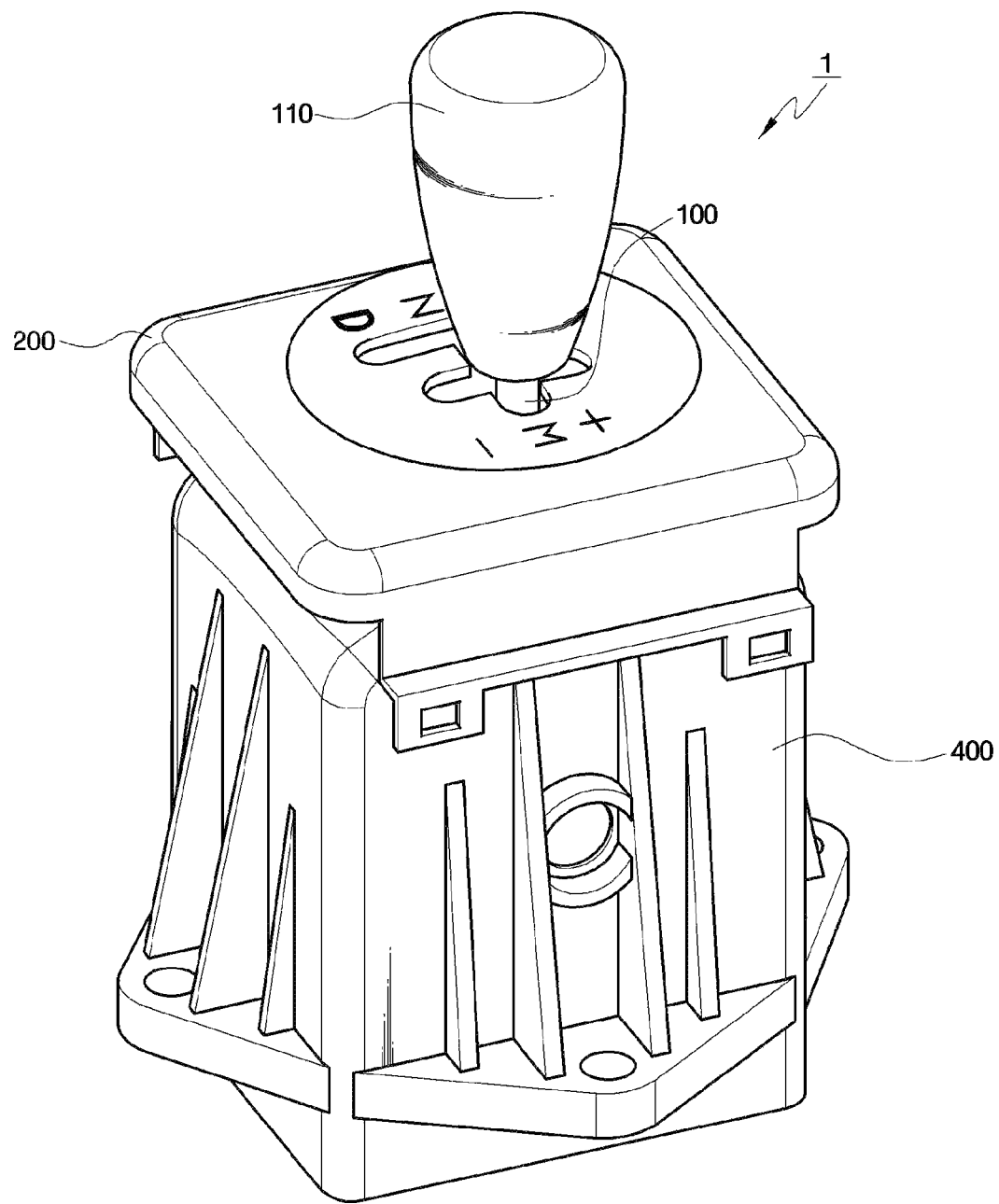
FIG. 3 is a schematic perspective view of an apparatus for electronically controllable transmission according to an exemplary embodiment of the present invention.

Therefore, even in an indicator structure having a shape as shown in FIG. 3, positions of automatic gears (reverse (R), neutral (N), and drive (D)) and manual gears (+ and −) can all be detected using one magnet and one 3D sensor.

Figure 4:
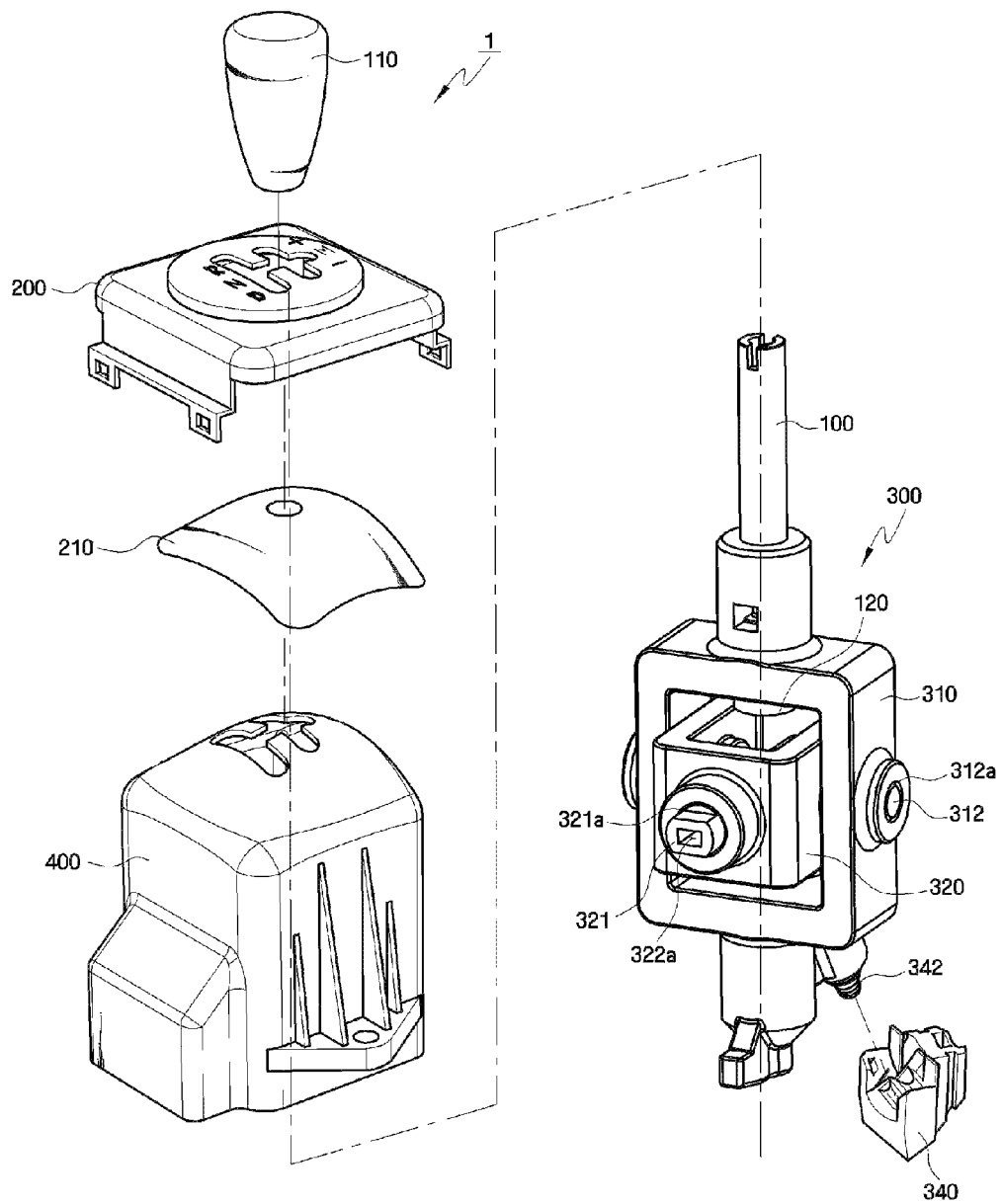
FIG. 4 is an exploded perspective view of the apparatus of FIG. 3.
Figure 5:
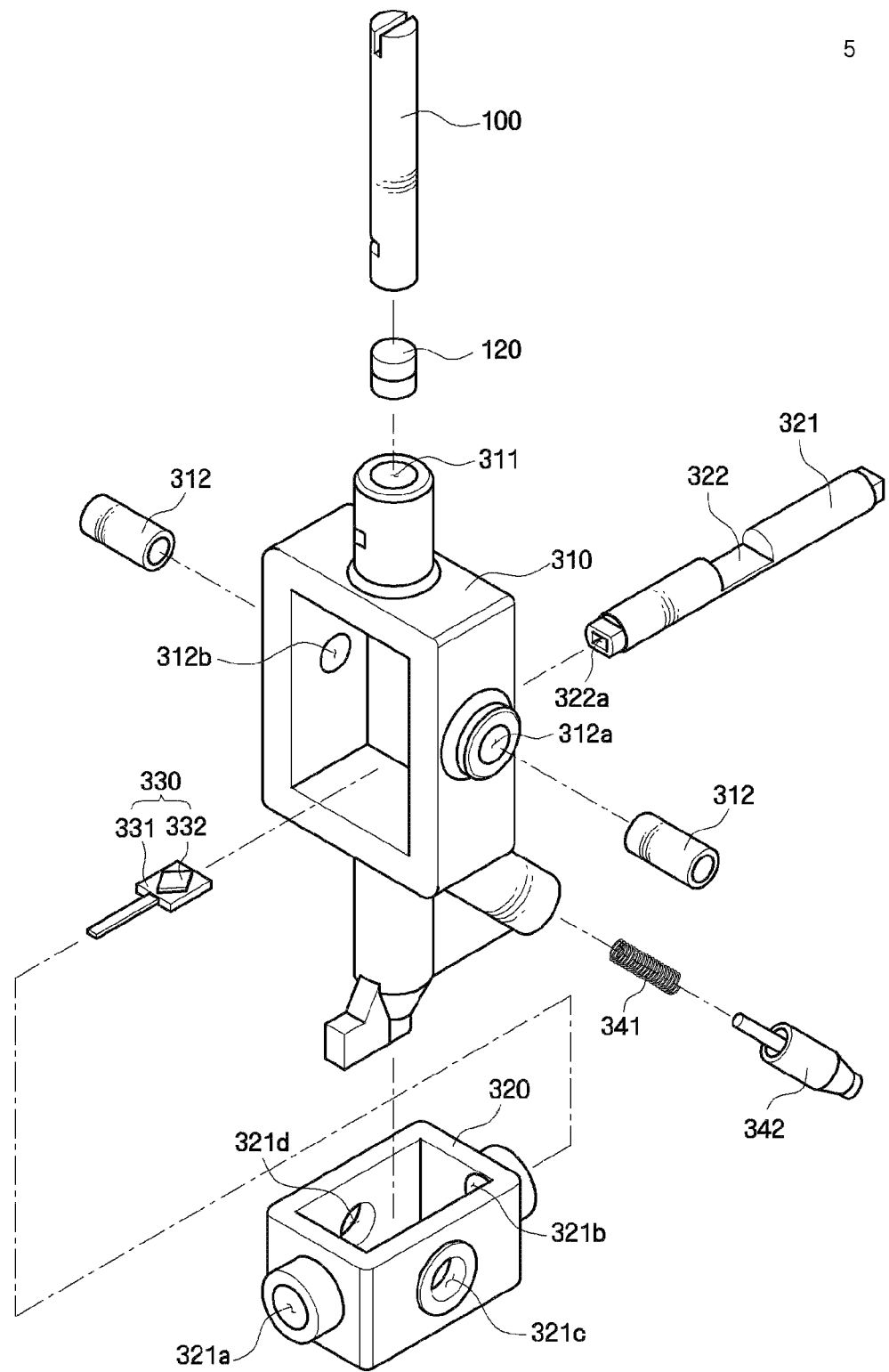
FIG. 5 is an exploded perspective view of a shift lever body included in the apparatus of FIG. 3.
Figure 6:
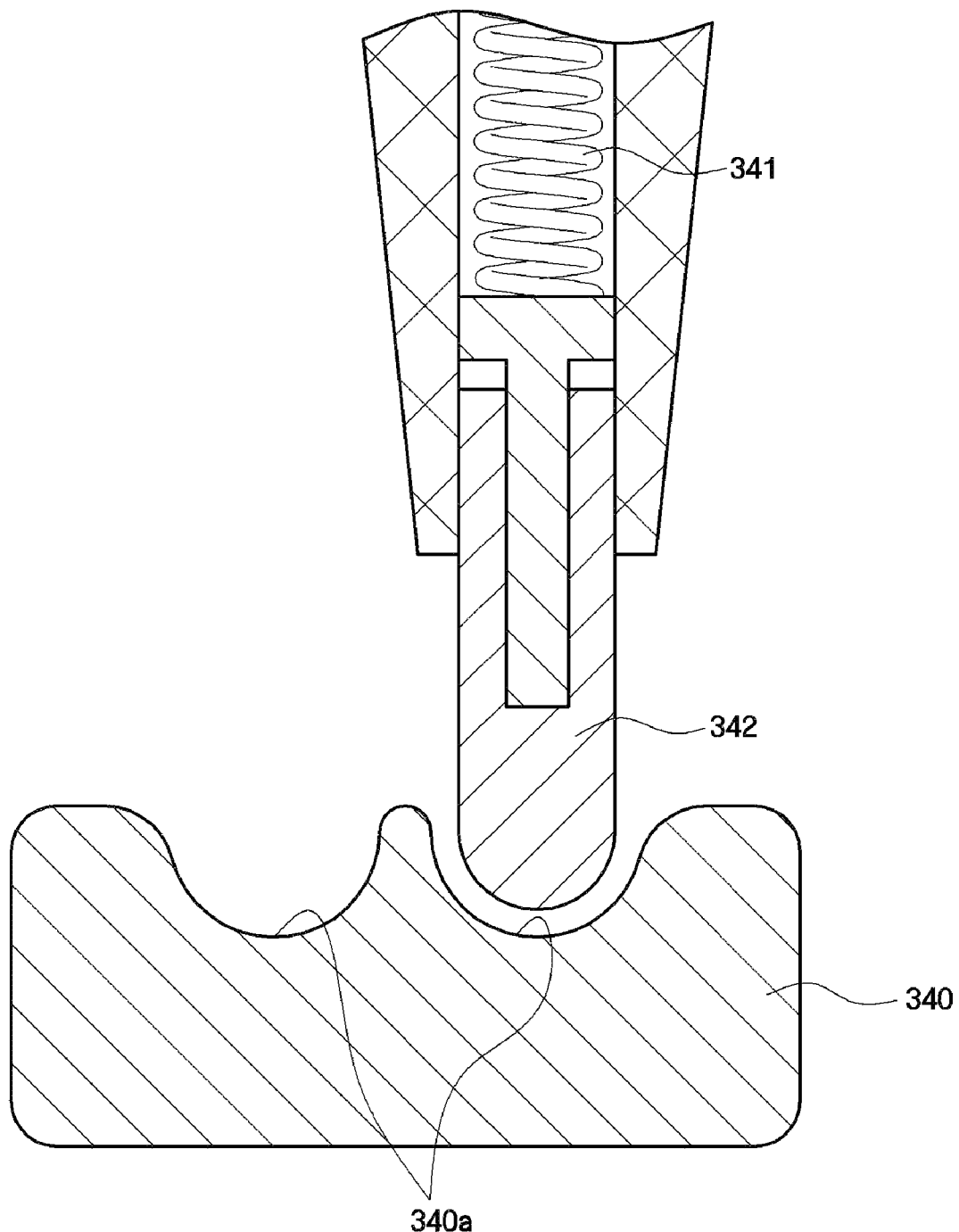
FIG. 6 is a cross-sectional view of a groove included in the apparatus of FIG. 3.

FIG. 3 is a schematic perspective view of an apparatus 1 for electronically controllable transmission according to an exemplary embodiment of the present invention. FIG. 4 is an exploded perspective view of the apparatus 1 of FIG. 3. FIG. 5 is an exploded perspective view of a shift lever body 300 included in the apparatus 1 of FIG. 3.

Referring to FIGS. 3 through 5, the apparatus 1 for electronically controllable transmission according to the current exemplary embodiment may include a shift lever 100, an indicator 200, the shift lever body 300, and a base bracket 400.

The shift lever 100 may move to shift gears. Specifically, the shift lever 100 may move within a predetermined range in a forward or backward direction or in a lateral direction. Directions in which the shift lever 100 moves may include a direction (hereinafter, referred to as a "shift direction") in which the shift lever 100 moves around a shift axis to select R, N or D and a direction (hereinafter, referred to as a "select direction") in which the shift lever 100 moves around a select axis to select a manual mode (M).

A knob 110 may be connected to an end of the shift lever 100. The knob 110 may function as a handle that a user holds to move the shift lever 100. Therefore, when the user moves the knob 110, the shift lever 100 connected to the knob 110 may move in the shift direction or the select direction, thereby allowing the user to shift gears.

A magnet 120 may be disposed at the other end of the shift lever 100, that is, at an opposite end of the shift lever 100 to the end thereof which is connected to the knob 110. In the current exemplary embodiment, the shift lever 100 is separate from the magnet 120. However, the shift lever 100 and the magnet 120 may also be formed as a single piece.

The magnet 120 has a north (N) pole and a south (S) pole. As the user moves the shift lever 100, the magnetic flux density of the magnet 120 changes. Accordingly, a sensor unit 330, which will be described later, detects the position of the shift lever 100 by sensing this change in the magnetic flux density of the magnet 120.

The indicator 200 indicates a gear to shift into and provides a passage along which the shift lever 100 can move. The passage formed in the indicator 200 may have an approximately "H" shape such as illustrated in FIG. 12A, FIG. 12B, FIG. 12C, FIG. 12D, and FIG. 12E. That is, the path of the shift lever 10 may include a horizontal path and a vertical path. In the current exemplary embodiment, the shift lever 100 moves along the above-described shape within a predetermined range in the forward or backward direction or in the lateral direction. However, this is merely an example used to promote the understanding of the present invention, and the present invention is not limited to this example. Along the shape of the passage formed in the indicator 200, the shift lever 100 can also move in a diagonal direction as well as in the forward or backward direction or in the lateral direction. That is, the shift lever 100 can move in all directions along the shape of the passage formed in the indicator 200.

For example, if the passage of the indicator 200 has a shape as shown in FIGS. 3 and 4, R, N, and D may be vertically provided on a leftmost side of the indicator 200, and "+" (up) and "−" (down), which are manual mode options, may be vertically provided in the middle of the indicator 200. The manual mode (M) provided on a rightmost side of the indicator 200 may be used to switch from an automatic transmission mode to a manual transmission mode. While park (P) is not particularly described, it is obvious to those of ordinary skill in the art that P can be added as a gear. Here, P may be installed in the form of a button on the knob 110 instead of being provided on the indicator 200.

The indicator 200 may include a light-emitting device (not shown), such as a light-emitting diode (LED), to enable a user to easily recognize a selected gear. For example, the light-emitting device may illuminate a gear selected by the user. In the current exemplary embodiment, the light-emitting device is included in the indicator 200. However, this is merely an example used to promote the understanding of the present invention. For the convenience of the user, the light-emitting device may be, but not necessarily, installed at a location (e.g., in the knob 110) readily noticeable to the user.

A slide 210 may inhibit foreign substances from entering the indicator 200 and the base bracket 400 and facilitate the operation of the shift lever 100. The slide 210 may be disposed between the indicator 200 and the base bracket 400 and may have a hole, through which the shift lever 100 passes, in the middle thereof. In addition, the slide 210 moves in accordance with the forward, backward, or lateral movement of the shift lever 100, thereby reducing friction resulting from the operation of the shift lever 100.

The shift lever body 300 may include a select guide 310 and a shift guide 320 which guide the shift lever 100 to move in the select direction or the shift direction.

The select guide 310 may have an approximately square shape with an exposed concave portion into which the shift guide 320 can be inserted. A hole 311 may be formed in an upper portion of the select guide 310, and the shift lever 100 and the magnet 120 may be inserted into the hole 311. In addition, inserting holes 312a and 312b, into which the select shaft 312 can be inserted, may be formed in the select guide 310. The select shaft 312 supports the select guide 310 in the direction of the select axis so that the select guide 310 can move in the select direction.

The shift guide 320 may be inserted into the exposed concave portion which is formed in the select guide 310 and may guide the shift lever 100 to move around the shift axis. To this end, the shift guide 320 may include through holes 321a and 321b which are formed in the direction of the shift axis and are penetrated by the shift shaft 321 so that the shift guide 320 can move in the shift direction. The shift guide 320 may further include inserting holes 321a and 321b which are formed in the direction of the select axis and into which the select shaft 312 is inserted so that the shift guide 320 can be connected to the select guide 310 and can be supported by the select guide 310.

The sensor unit 330 may be mounted on the shift shaft 321 to sense the magnetic flux density of the magnet 120. The sensor unit 330 may determine a gear by sensing the position of the shift lever 100 when the shift lever 100 moves in the shift direction or the select direction.

The sensor unit 330 may include a sensor 331 which senses a magnetic flux density and a printed circuit board (PCB) 332 which is electrically connected to the sensor 331. The shift shaft 321 may include an exposed concave portion 322 to expose the sensor 331 so that the sensor 331 can sense the magnetic flux density of the magnet 120. In addition, the shift shaft 321 may include a through hole 322a formed from the exposed concave portion 322 to an end of the shift shaft 321. A line used to transmit an output signal, which corresponds to the magnetic flux density sensed by the sensor 331, to an external destination may penetrate the through hole 322a. Here, the exposed concave portion 322 is formed at a location at which the shift axis and the select axis intersect. This is to place the sensor 311 at the location at which the shift axis and the select axis intersect. Therefore, as the shift lever 100 moves in the shift direction or the select direction, the magnet 120 disposed above the sensor 311 may also move while maintaining a predetermined gap from the sensor 311.

In the current exemplary embodiment, the sensor 331 may sense the spatial magnetic flux density of the magnet 120 according to the movement of the shift lever 100 in the direction of each of the X-, Y- and Z-axes. Then, the sensor 331 may convert the sensed magnetic flux density in the direction of each of the X-, Y- and Z-axes into an electrical signal and output the electrical signal.

The sensor 331 may be a 3D sensor. A 3D sensor is a sensor that senses the movement of an object in a 3D space and a direction in which the object moves. According to the current exemplary embodiment, the sensor 331 may measure the magnetic flux density of the magnet 120 according to the movement of the magnet 120 installed at an end of the shift lever 100. That is, the sensor 331 can sense the movement of the shift lever 100 both in the shift direction and the select direction.

That is, when the shift lever 100 moves around the shift axis or the select axis, a gap between the 3D sensor 331 and the magnet 120 gradually increases toward the end of the shift axis or the select axis. In this case, a conventional 2D sensor requires an additional device to maintain a constant gap between itself and a magnet. However, the 3D sensor 331 does not need to maintain a constant gap between itself and the magnet 120 because it can sense the magnetic flux density of the magnet 120 on the Z-axis even when the gap between itself and the magnet 120 is increased. Accordingly, the 3D sensor 331 does not require an additional device for maintaining a constant gap between itself and the magnet 120. This will be described in more detail later.

Therefore, there is no need to install a separate sensor around each of the shift axis and the select axis of the shift lever 100. Consequently, the structure of the apparatus 1 for electronically controllable transmission can be simplified, thereby reducing installation space and costs.

The PCB 332 of the sensor unit 330 according to the current exemplary embodiment is bar-shaped. The sensor 331 may be installed on a side of the PCB 332, and an opposite side of the PCB 332 may be inserted into the through hole 322a which is connected to the exposed concave portion 322. Accordingly, the sensor 331 may be mounted in the exposed concave portion 322. In addition, a line is electrically connected to the PCB 332 by the through hole 322a. When the PCB 332 outputs a signal corresponding to the magnetic flux density sensed by the sensor 331, the output signal may be delivered to an external processing module (not shown), which senses a gear based on the output signal, via the line. The PCB 332 can be implemented as any circuit as long as it can convert a signal of the sensor 331.

In the current exemplary embodiment, both ends of the shift shaft 321 are fixed in place. This is to fix the position of the sensor 331 while the shift lever 100 moves in the select direction or the shift direction. Advantages that can be obtained by fixing the position of the sensor 331 will be described later.

A groove 340 may be formed on a side of a lower portion of the select guide 310 to provide a user with the feel of operating the shift lever 100 when the user shift gears by moving the shift lever 100. In addition, a concave portion 340a may be formed in a surface of the groove 340 which faces the select guide 310. Here, the concave portion 340a may have a similar shape to that of the passage which is formed in the indicator 200 and along which the shift lever 100 can move. The concave portion 340a contacts a bullet 342 connected to a spring 341 and thus provides the user with the feel of operating the shift lever 100.

For example, when the user moves the shift lever 100, the bullet 342 may move along the concave portion 340a due to the compression and restoration of the spring 341 installed on a surface of the select guide 310 which faces the groove 340. Whenever the bullet 342 moves along the concave portion 340a, the user can have the feel of operating the shift lever 100.

Figure 7:
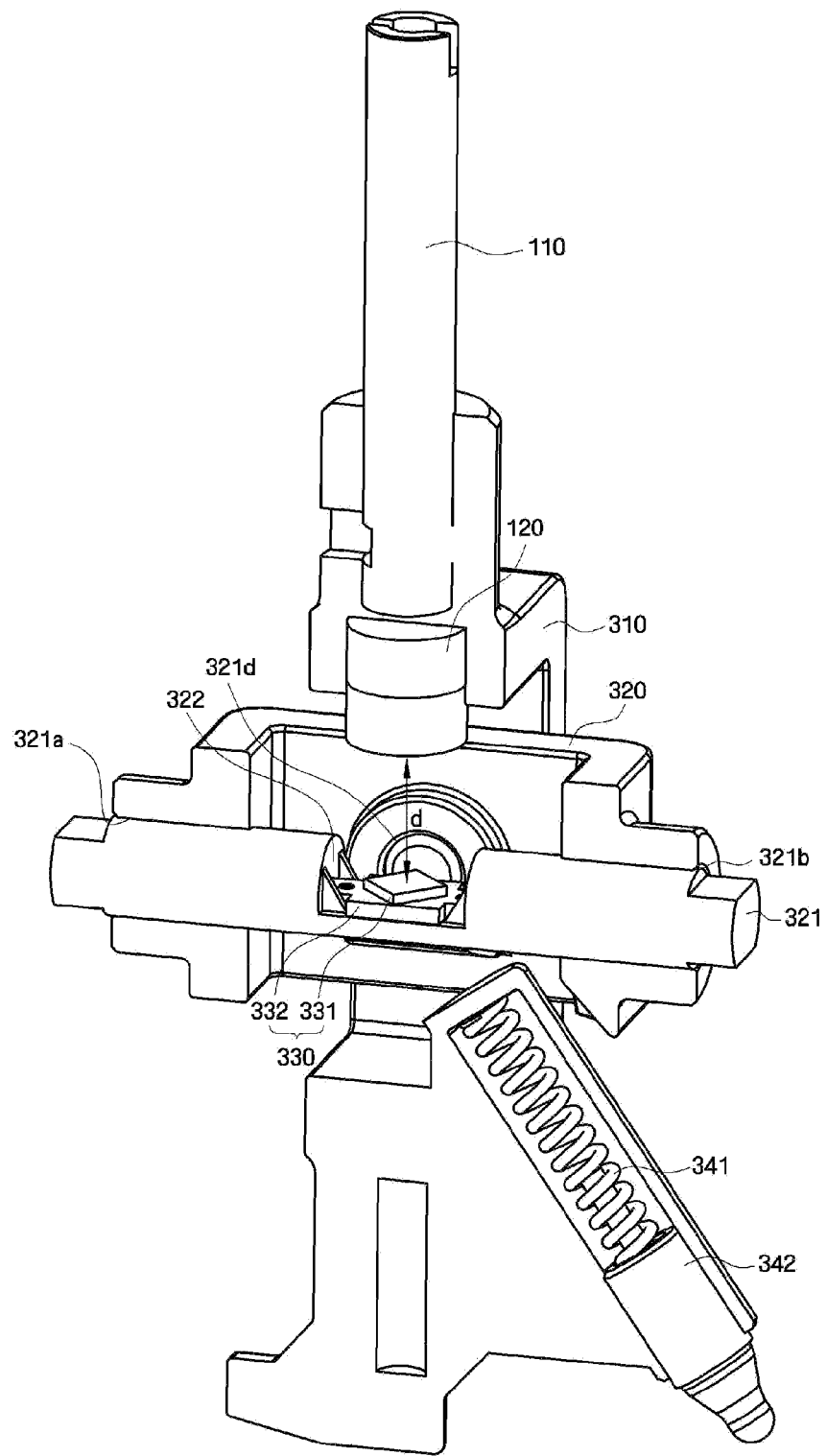
FIG. 7 is a schematic diagram illustrating the internal structure of the shift lever body shown in FIG. 5.

FIG. 7 is a schematic diagram illustrating the internal structure of the shift lever body 300 shown in FIG. 5.

Referring to FIG. 7, the magnet 120 and the sensor 331 are separated from each other by a gap d, and both ends of the shift shaft 321 are fixed in place. Thus, even when a user moves the shift lever 100 around the select axis, that is, even when the shift lever 100 is moved in the select direction by the select guide 310, since the magnet 120 moves along the circumference of a circle with a constant radius corresponding to the initial gap d between the magnet 120 and the sensor 331, the gap d between the magnet 120 and the sensor 331 can be maintained constant.

Figure 8:
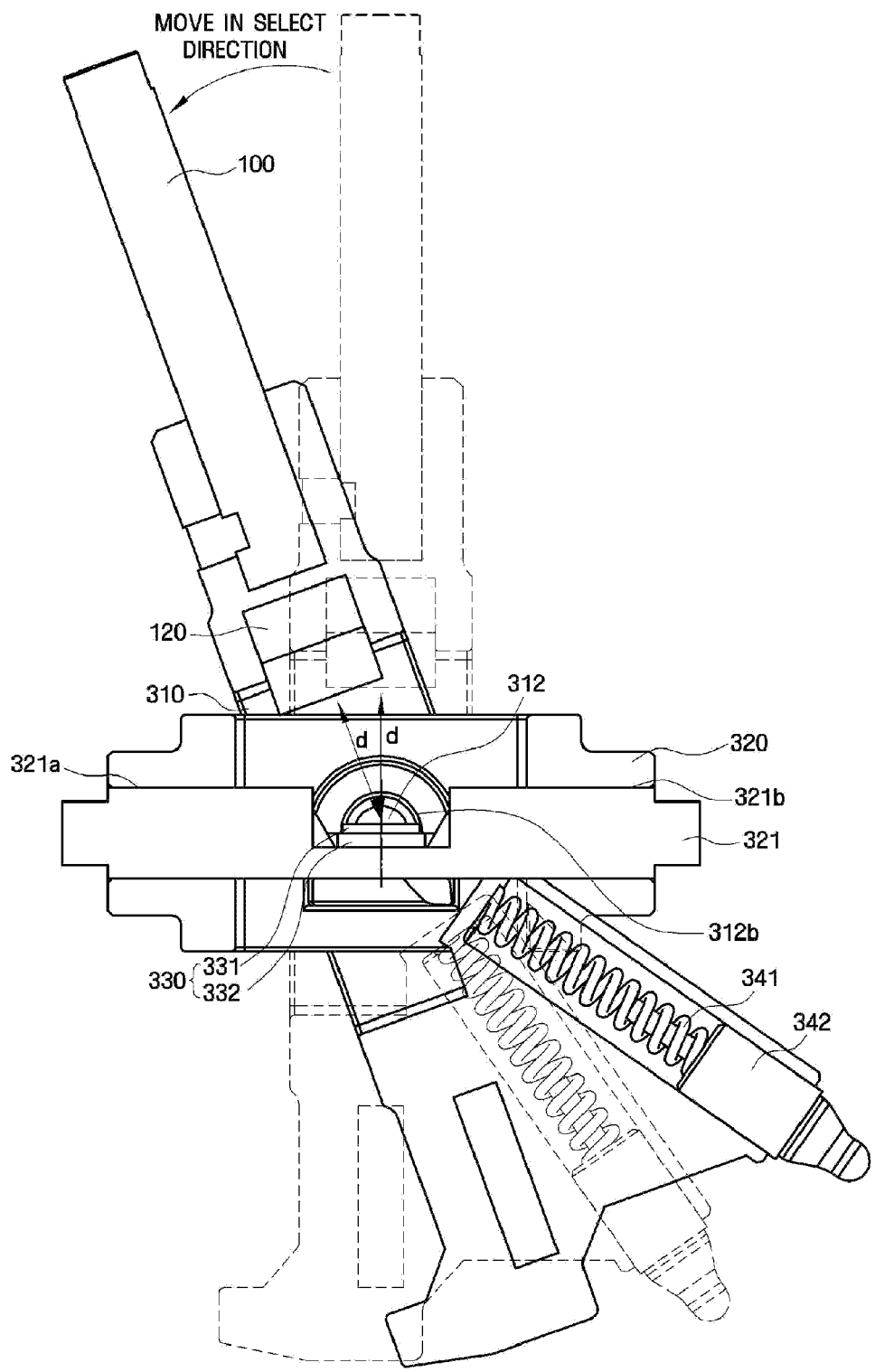
FIG. 8 is a schematic diagram of the shift lever body of FIG. 5 which moves in a select direction according to an exemplary embodiment of the present invention.

For example, when a user moves the shift lever 100 in the select direction as shown in FIG. 8, the gap d between the magnet 120 and the sensor 331 is maintained unchanged before and after the movement of the shift lever 100. Since the gap d between the magnet 120 and the sensor 331 can be maintained constant regardless of which gear the user selects, the possibility of a change in the sensed magnetic flux density resulting from a change in the gap d between the magnet 120 and the sensor 331 can be eliminated, thereby preventing malfunctions of the apparatus 1 for electronically controllable transmission.

While a case in which the shift lever 100 moves in the select direction has been described as an example with reference to FIG. 8, a similar description can be applied to the shift direction.

Figure 9:
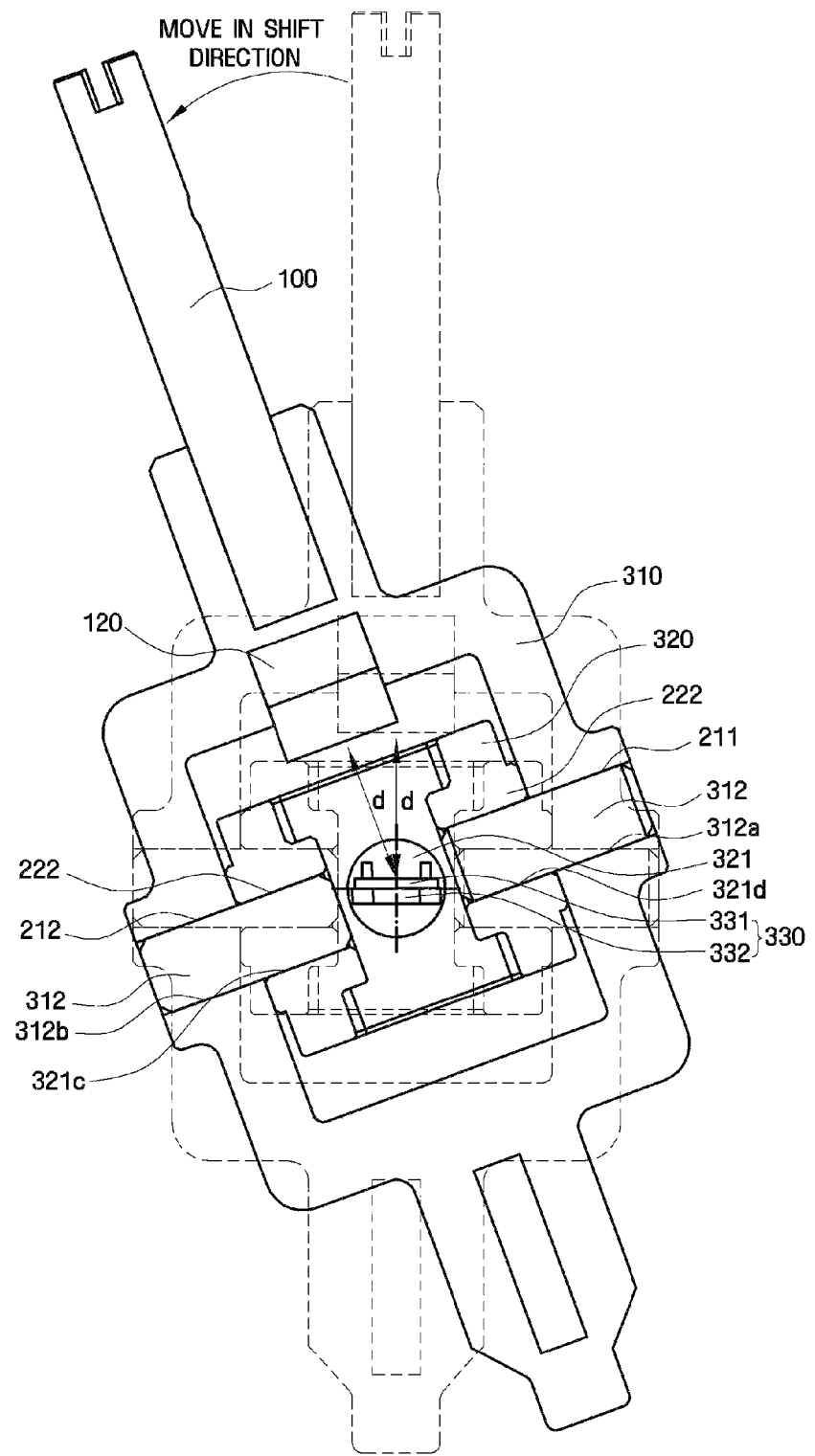
FIG. 9 is a schematic diagram of the shift lever body of FIG. 5 which moves in a shift direction according to an exemplary embodiment of the present invention.

For example, when a user moves the shift lever 100 in the shift direction as shown in FIG. 9, the gap d between the magnet 120 and the sensor 331 is maintained unchanged before and after the movement of the shift lever 100. As when the user moves the shift lever 100 in the select direction, when the user moves the shift lever 100 in the shift direction, the gap d between the magnet 120 and the sensor 331 can be maintained constant regardless of which gear the user selects. Thus, the possibility of a change in the sensed magnetic flux density resulting from a change in the gap d between the magnet 120 and the sensor 331 can be eliminated, thereby preventing malfunctions of the apparatus 1 for electronically controllable transmission.

In the current exemplary embodiment, both ends of the shift shaft 321 are fixed in place. This does not matter when a user moves the shift lever 100 in the select direction. However, when the user moves the shift lever 100 in the shift direction, both ends of the select shaft 312 may be selectively fixed in place.

For example, both ends of the select shaft 312 may be fixed in place when the shift lever 100 is moved in the select direction but may be movable when the shift lever 100 is moved in the shift direction. In the current exemplary embodiment, a structure that allows both ends of the select shaft 312 to be stationary or movable is not particularly illustrated in the drawings. However, any structure that can selectively allow both ends of the select shaft 312 to be stationary or movable according to the direction in which the shift lever 100 moves can be applied.

The base bracket 400 may surround the shift lever body 300 and protect a portion that senses a gear selected by the movement of the shift lever 100. The base bracket 400 may have the groove 340 in a lower portion thereof. The groove 340 forms a passage along which the bullet 342 of the shift lever 100 can move. For example, the groove 340 may be formed in a shape similar to that of the passage formed in the indicator 200.

Figure 10:
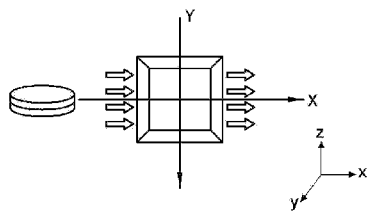
FIG. 10 is a schematic diagram illustrating signals output from a sensor which is mounted in a normal direction or turned at a predetermined angle according to an exemplary embodiment of the present invention.
Figure 11:
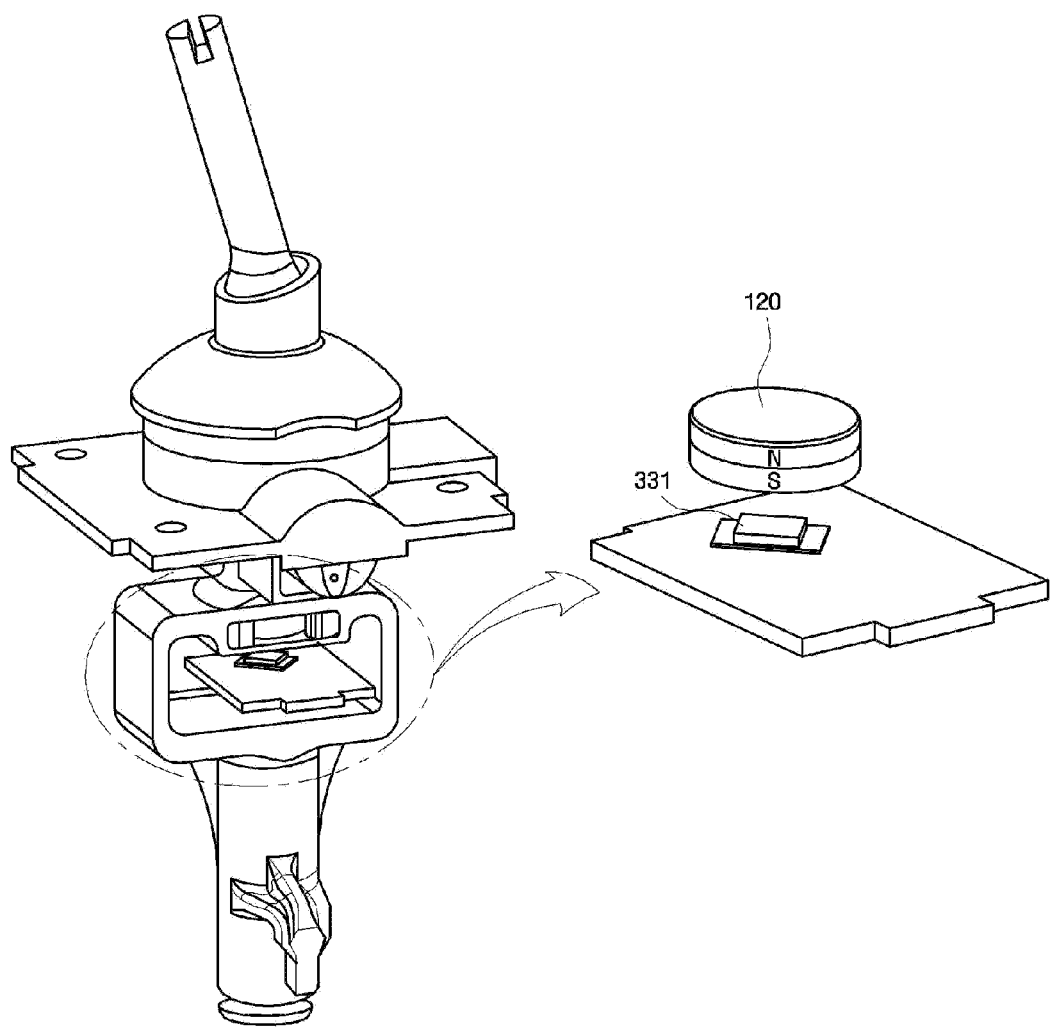
FIG. 11 is a schematic diagram illustrating poles of a magnet which faces a sensor according to an exemplary embodiment of the present invention.
Figure 12A:
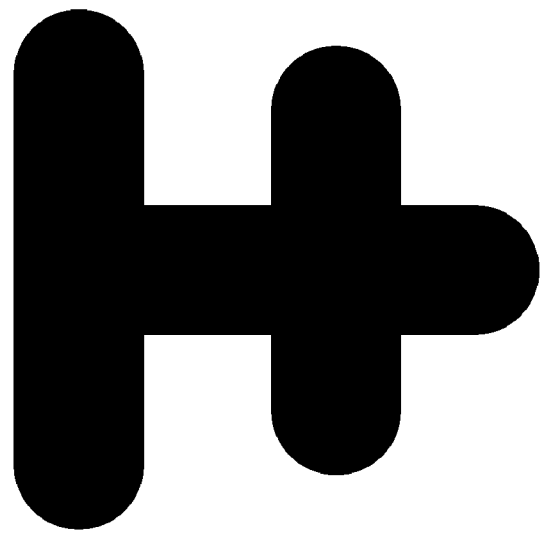
FIG. 12A illustrates a shape of a passage in an indicator of a apparatus for electronically controllable transmission according to an exemplary embodiment of the present invention.
Figure 12B:
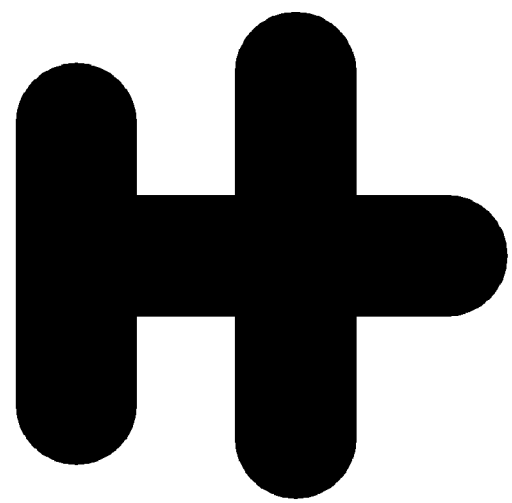
FIG. 12B illustrates another shape of a passage in an indicator of a apparatus for electronically controllable transmission according to an exemplary embodiment of the present invention.
Figure 12C:
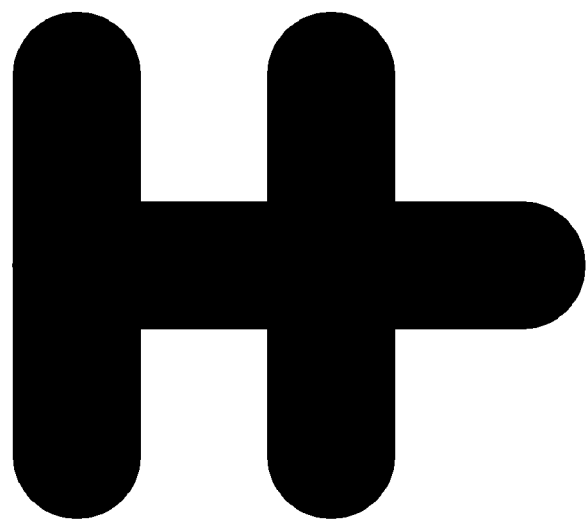
FIG. 12C illustrates another shape of a passage in an indicator of a apparatus for electronically controllable transmission according to an exemplary embodiment of the present invention.
Figure 12D:
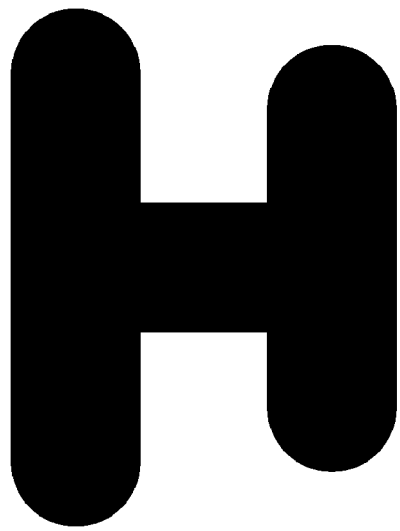
FIG. 12D illustrates another shape of a passage in an indicator of a apparatus for electronically controllable transmission according to an exemplary embodiment of the present invention.
Figure 12E:
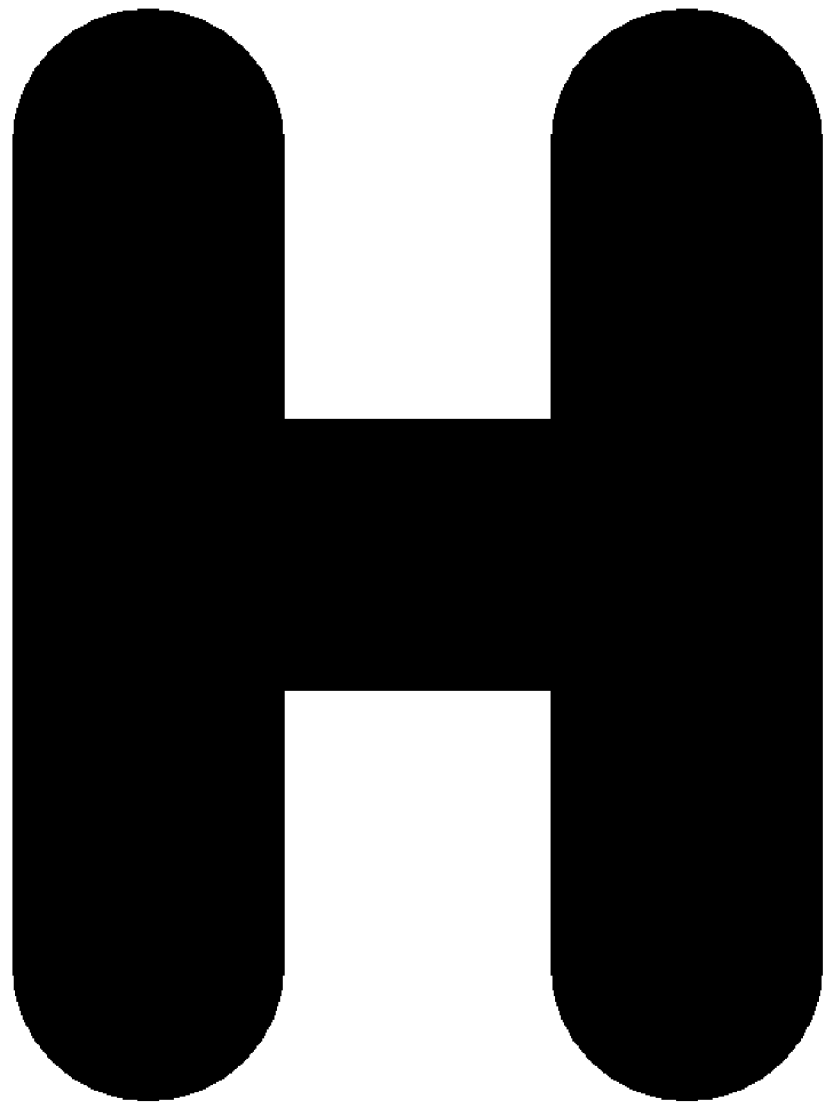
FIG. 12E illustrates another shape of a passage in an indicator of an apparatus for electronically controllable transmission according to an exemplary embodiment of the present invention.

FIG. 10 is a schematic diagram illustrating signals generated according to the direction of a 3D hall sensor 331 as a magnet 120 moves to a predetermined angle in either left or right direction, wherein it is assumed that an angle at which the magnet and the 3D hall sensor 331 face each other is zero degrees. In addition, elements substantially identical to those illustrated in FIGS. 8 and 9 are indicated by like reference numerals.

When the magnet 120 and the 3D hall sensor 331 are placed in a normal direction, the 3D hall sensor 331 outputs three signals of the X-, Y-, and Z-axes. In this case, only the signal of the X-axis on which the shift lever 100 moves has linearity while the signal of the -Y axis, which is perpendicular to the movement direction of the shift lever 110, remains unchanged. In addition, the signal of the Z-axis, which corresponds to the spatial distance of the magnet 120 from the 3D hall sensor 331, slightly changes at the end of the Z-axis.

That is, a range value of a sensor signal needs be defined to detect the movement range of the shift lever 100. However, only a signal value of the X-axis has linearity when the shift lever 100 moves on the X-axis, and only a signal value of the Y-axis has linearity when the shift lever 100 moves on the Y-axis. That is, there is a high dependency on a value of any one of the X-axis and the Y-axis. However, if the 3D hall sensor 331 is mounted such that it is turned at an angle, the dependency on a value of any one axis can be reduced. Accordingly, the movement of the magnet 120 can be sensed in an accurate and stable manner.

In FIG. 10, if the 3D hall sensor 331 is mounted such that it is turned at an angle, even when the magnet 120 moves in the direction of the X-axis, the 3D hall sensor 331 can sense the magnetic flux densityes of the magnet 120 on both the X-axis and the Y-axis. If the magnetic flux densityes of the magnet 120 on both the X-axis and the Y-axis are sensed, the signals of the X- and Y-axes can have linearity according to the distance traveled by the shift lever 100. Likewise, even when the magnet 120 moves on the Y-axis, the signals of the X- and Y-axes can have linearity.

That is, since both the signal of the X-axis and the signal of the Y-axis have linearity, if the variation in the signal of the X-axis and the variation in the signal of the Y-axis are sensed, the position of the shift lever 10 can be detected more accurately than when the magnet 120 and the 3D hall sensor 331 are placed in the normal direction.

When the 3D hall sensor 331 and the magnet 120 face each other, the 3D hall sensor 331 can sense the magnetic flux density of the magnet 120 even if both the N and S poles of the magnet 120 face the 3D hall sensor 331. However, the 3D hall sensor 331 can sense the magnetic flux density of the magnet 120 more accurately when any one of the N and S poles of the magnet 120 faces the 3D hall sensor 331.

When both poles of the magnet 120 face the 3D hall sensor 331, a magnetic flux density from only one side of the magnet 120 is input to the 3D hall sensor 331. However, when only one of the two poles of the magnet 120 faces the 3D hall sensor 331, a magnetic flux density from 360 degrees around the magnet 120 is input to the 3D hall sensor 331. Thus, the position of the shift lever 100 can be detected more easily than when both poles of the magnet 120 face the 3D hall sensor 331.

An apparatus for electronically controllable transmission according to the present invention provides at least one of the following advantages.

First, since the position of a shift lever can be easily sensed using one 3D hall sensor and one magnet, the structure of a sensing unit can be simplified, thereby increasing layout utilization and reducing costs.

Second, a gap between the 3D hall sensor and the magnet connected to an end of the shift lever can be maintained constant while the shift lever moves. Thus, the magnetic flux density of the magnet can be sensed more accurately.

Third, the 3D hall sensor is turned at a predetermined angle so that at least two of X-, Y-, and Z-axis signals can have linearity. Accordingly, the position of the shift lever can be sensed in a stable manner.

However, the effects of the present invention are not restricted to the one set forth herein. The above and other effects of the present invention will become more apparent to one of ordinary skill in the art to which the present invention pertains by referencing the claims.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. An apparatus for an electronically controllable transmission comprising:
    a shift lever including one end connected to a magnet and supported in a shift lever body mounted on a shift shaft and a select shaft, the shift lever configured to shift gears of the transmission responsive to movement of the shift lever, the shift lever body providing for the shift lever to move about a shift axis defined by a longitudinal axis of the shift shaft and a select axis defined by a longitudinal axis of the select shaft, the apparatus providing for the magnet to travel about a pivot point defined by an intersection of the shift axis and the select axis; and
    a sensor unit including a single hall sensor configured to sense movement of the magnet in each of three orthogonal axes which is mounted fixedly at the pivot point, the apparatus providing for a distance between the center of the magnet and the center of the single hall sensor to remain unchanged upon movement of the shift lever.

2. The apparatus of claim 1, wherein the shift lever body includes:
    a select guide including one end which is connected to the magnet and provides for the shift lever to move about the select axis; and
    a shift guide disposed in an exposed concave portion which is formed in the select guide and provides for the shift lever to move about the shift axis.

3. The apparatus of claim 2, wherein the select guide includes a first inserting hole into which the select shaft is inserted, the select shaft supporting the select guide and providing for the shift lever to move around the select axis, wherein the shift guide includes a second inserting hole which is formed in the axial direction of the select axis and into which the select guide is inserted so that the shift guide connects with the select guide, and wherein the shift guide includes a through hole which is formed in the axial direction of the shift axis and is penetrated by the shift shaft, the through hole providing for the shift guide to move around the shift axis.

4. The apparatus of claim 3, wherein the shift shaft includes a first end and a second end, wherein the first end and the second end of the shift shaft are mounted fixedly, and wherein the shift lever is configured to move about a fixed position of the shift shaft.

5. The apparatus of claim 3, wherein the select shaft includes a first portion located on a first side a the shift shaft and a second portion formed on a second side of the shift shaft, and wherein the select shaft is movable upon movement of the shift lever around the shift axis.

6. The apparatus of claim 3, wherein the sensor unit includes a printed circuit board configured to output a signal corresponding to a magnetic flux density sensed in the sensor.

7. The apparatus of claim 6, wherein the shift shaft includes an exposed concave portion in which the sensor unit is mounted and a through hole which is formed in the shift shaft along a longitudinal axis of the shift shaft from the exposed concave portion to an end of the shift shaft, an electrical signal line disposed within the through hole and configured to transmit an output signal corresponding to the magnetic flux density sensed by the sensor to the printed circuit board.

8. The apparatus of claim 7, wherein the exposed concave portion is disposed where the shift axis and the select axis intersect.

9. An apparatus for an electronically controllable transmission comprising:
   a shift lever including one end connected to a magnet, the shift lever configured to shifts gear of the transmission responsive to movement of the shift lever;
   a shift lever body mounted on a shift shaft and a select shaft, the shift lever body connected to the shift lever and providing for the shift lever to move about a shift axis defined by a longitudinal axis of the shift shaft and a select axis defined by a longitudinal axis of the select shaft; and
   a sensor unit including a single hall sensor mounted in the shift lever body at a pivot point defined by an intersection of the shift axis and the select axis, the single hall sensor being a three-dimensional sensor configured to sense a magnetic flux of the magnet upon movement of the shift lever and configured to sense the movement of the magnet in an X axis, a Y axis, and a Z axis, wherein a distance between the center of the magnet and the center of the single hall sensor is unchanged upon movement of the shift lever.

10. The apparatus according of claim 9, wherein the three-dimensional sensor is oriented in a predetermined angle selected to produce a first linear output signal as the magnet moves through a first one of the X axis, the Y axis, and the Z axis, and to produce a second linear output signal as the magnet moves through a second one of the X axis, the Y axis, and the Z axis.

11. The apparatus of claim 9, wherein the three dimensional sensor is configured to produce a linear X output signal and a linear Y output signal responsive to movement of the magnet in one of the X axis and the Y axis.

12. The apparatus of claim 9, wherein a first pole of the magnet is disposed toward the sensor and a second pole of the magnet is disposed toward the shift lever.

13. An apparatus for an electronically controllable transmission comprising:
   a shift lever mounted on a shift shaft and a select shaft and including one end which is connected to a magnet, the shift lever configured to move in an X axis and in a Y axis; and
   a sensor unit disposed proximate the magnet at a pivot point defined by an intersection of a shift axis defined by a longitudinal axis of the shift shaft and a select axis defined by a longitudinal axis of the select shaft,
   wherein the sensor unit includes a single three-dimensional magnetic sensor configured to sense a Z-axis magnetic flux dependent on a distance of separation between the magnet and the sensor unit, an X-axis magnetic flux dependent upon movement of the shift lever in the X axis, and a Y-axis magnetic flux dependent upon movement of the lever in the Y axis, and produces a linear output signal corresponding to the movement of the lever in at least two of the X axis, the Y axis, and the Z axis and wherein a distance between the center of the magnet and the center of the single three-dimensional sensor is unchanged upon movement of the shift lever.

14. The apparatus of claim 9, wherein the apparatus provides for the magnet to travel about a pivot point defined by an intersection of the shift axis and the select axis.

15. The apparatus of claim 13, further comprising a shift lever body mounted on a shift shaft and a select shaft, the shift lever body supporting the shift shaft, the apparatus providing for the magnet to travel about a pivot point defined by an intersection of a shift axis defined by a longitudinal axis of the shift shaft and a select axis defined by a longitudinal axis of the select shaft.

* * * * *

UNITED STATES PATENT AND TRADEMARK OFFICE
CERTIFICATE OF CORRECTION

| | | |
|---|---|---|
| PATENT NO. | : 8,261,630 B2 | Page 1 of 1 |
| APPLICATION NO. | : 12/783685 | |
| DATED | : September 11, 2012 | |
| INVENTOR(S) | : Jeong-Ho Bak et al. | |

It is certified that error appears in the above-identified patent and that said Letters Patent is hereby corrected as shown below:

IN THE CLAIMS:

Column 12, in Claim 10, line 1, please delete the word "according".

Signed and Sealed this
Eleventh Day of December, 2012

David J. Kappos
*Director of the United States Patent and Trademark Office*